3,221,022
1-(β-DIMETHYLAMINO-ETHYL)-2-(p-ETHOXY-BENZYL)-5,6-DICHLORO-BENZIMIDAZOLES
Alfred Hunger, Jindrich Kebrle, and Alberto Rossi, Basel, and Karl Hoffmann, Binningen, Switzerland, assignors to Ciba Corporation, a corporation of Delaware
No Drawing. Filed Mar. 8, 1961, Ser. No. 94,150
Claims priority, application Switzerland, Mar. 22, 1960, 3,180/60
The portion of the term of the patent subsequent to April 18, 1978, has been disclaimed
1 Claim. (Cl. 260—309.2)

The present invention relates to the manufacture of 1 - (β - dimethylamino-ethyl)-2-(para-ethoxybenzyl)-5:6-dichloro-benzimidazole and of its salts.

The new compound has very good analgesic action and is superior to the known benzimidazoles because of the absence of undesired secondary effects, such, for example, as respiratory depression in analgesically effective doses. It is therefore intended to be used as an analgesic.

The new compound is manufactured by known methods. According to one process the dimethylamino-ethyl radical is introduced directly or by stages into the 1-position of 2-(para-ethoxybenzyl)-5:6-dichloro-benzimidazole. Thus, for example, 2-(para-ethoxybenzyl)-5:6-chloro-benzimidazole can be reacted with a reactive ester of an alcohol of the formula

HO—CH$_2$—CH$_2$—R in which R represents a dimethylamino group or a residue convertible thereinto, for example a hydroxyl group, and in a resulting compound containing a residue convertible into the dimethylamino group said residue is so converted, a hydroxyl group, for example, by chlorination and subsequent reaction with dimethylamine. Reactive esters are more especially those of strong inorganic or organic acids, such as the hydrohalic acids or organic sulfonic acids such as paratoluenesulfonic acid. The introduction is preferably carried out in the presence of a condensing agent, more especially one that is capable of forming metal salts with a benzimidazole, such as alkali metals or alkaline earth metals, for example sodium, lithium or calcium, or their amides, hydrides, hydrocarbon compounds, alcoholates, oxides or hydroxides, for example sodamide, sodium hydride, lithium butyl, potassium phenyl, lithium phenyl, potassium tertiary butylate, potassium tertiary amylate, sodium ethylate, sodium oxide or sodium hydroxide, or with the use of a pre-formed metal salt of 2-(para-ethoxybenzyl)-5:6-dichloro-benzimidazole.

According to another process for the manufacture of the new compound the benzimidazole ring substituted in the 2-position by a para-ethoxybenzyl group is formed by cyclisation of a 2-(R—CH$_2$—CH$_2$—NH)-4:5-dichloro-aniline or a suitably N-substituted derivative thereof, in which formula R has the above meaning. The residue convertible into the dimethylamino group is then converted into this group, in the case of a halogen for example by reaction with dimethylamine. Thus, for example 2-(dimethylamino-ethylamino)-5:6-dichloroaniline can be subjected to a direct or stepwise cyclisation with para-ethoxy-phenylacetic acid or a reactive functional derivative thereof, more especially with an ester with an alcohol that is easy to eliminate or with an imino ether. The final product of the present invention can also be manufactured by carrying out the condensation with p-ethoxyphenyl-acetaldehyde or a functional derivative thereof instead of with a p-ethoxy-phenylacetic acid and subjecting the resulting product to oxidation. The starting materials used in the aforementioned reactions can, if desired, be formed in the course of the reaction.

According to another variant of the process an ethoxy group is introduced into the para-position of the benzyl radical of a 1-(dimethylamino-ethyl)-2-benzyl-5:6-dichlorobenzimidazole, for example by substituting an ethoxy group for a free hydroxyl group.

The reactions of the present process are performed in the presence or absence of diluents and/or condensing agents, if necessary at an elevated temperature, under atmospheric or superatmospheric pressure.

Depending on the reaction conditions employed the new compounds are obtained in the form of the free bases or of their salts. From the salts the free bases can be prepared in as such known manner. From the bases salts can be prepared by reaction with acids suitable for forming therapeutically useful salts; such acids are for example the hydrohalic acids, sulfuric, nitric, phosphoric, thiocyanic, acetic, propionic, oxalic, malonic, succinic, malic, methanesulfonic, ethanesulfonic, hydroxyethanesulfonic, benzenesulfonic or toluenesulfonic acid or therapeutically active acids.

The starting materials are known or can be prepared by known methods.

The invention includes also any variant of the process in which an intermediate obtained at any stage of the process is used as starting material and the remaining step or steps is/are carried out.

The new compound can be used as a medicament, for example in the form of pharmaceutical preparations containing the compound or a salt thereof in admixture with an organic or inorganic, solid or liquid, pharmaceutical excipient suitable for enteral, parenteral or local administration. Suitable excipients are substances that do not react with the new compound such, for example, as water, gelatine, lactose, starches, magnesium stearate, talc, vegetable oils, benzyl alcohols, gums, polyalkylene glycols, white petroleum jelly, cholesterol or other known pharmaceutical excipients. The pharmaceutical preparations may be, for example tablets, dragées, ointments, creams, or in liquid form solutions, suspensions or emulsions. They may be sterilized and/or may contain assistants such as preservatives, stabilizers, wetting agents or emulsifiers, salts for regulating the osmotic pressure or buffer substances. They may also contain further substances of therapeutical value.

The following example illustrates the invention.

*Example*

A mixture of 14.5 grams of para-ethoxyphenylaceto-nitrile, 5.2 cc. of alcohol and 120 cc. of chloroform is saturated at room temperature with dry hydrogen chloride gas and then kept for 12 hours at room temperature. 11.3 grams of 2-(β-dimethylamino-ethylamino)-4:5-dichloroaniline are then added and the reaction mixture is stirred for 20 hours under reflux. The solution is then evaporated to dryness in vacuo, the residue is dissolved in dilute hydrochloric acid, the hydrochloric solution is washed with ether, alkalinized with ammonia, and the liberated base is taken up in ether. The ethereal extract is dried over magnesium sulfate, concentrated and diluted with warm pentane, whereupon 1-(β-dimethylamino-ethyl) - 2 - (para-ethoxybenzyl)-5:6-dichloro-benzimidazole crystallizes in the form of needles melting at 91–92.5° C.

The hydrochloride is prepared with the calculated amount of alcoholic hydrochloric acid; after having been recrystallized from alcohol+ether it melts at 120° C. with decomposition. A second modification of the hydrochloride melting at 140–141° is obtained by crystallisation from water.

The 2 - (β-dimethylamino-ethylamino)-4:5-dichloroaniline used as starting material can be prepared in the following manner:

87.7 grams of 2:4:5-trichloro-nitrobenzene are slowly added in portions to 90 cc. of β-dimethylamino-ethylamine with stirring and heating to 90° C. When all has been added the mixture is stirred for 15 minutes at 135° C., cooled and dissolved in dilute hydrochloric acid. The clear acid solution is rendered alkaline while being stirred, whereby an orange-colored crystallizate is caused to precipitate; it is suctioned off, washed with water, dried and recrystallized from methanol. The resulting 2-(β-dimethylamino-ethylamino)-4:5-dichloro-nitrobenzene melts at 130–132° C.

50 grams of 2-(β-dimethylamino-ethylamino)-4:5-dichloronitrobenzene are hydrogenated in 500 cc. of alcohol with 10 grams of Raney nickel catalyst in a duck-shaped shaking vessel at room temperature under atmospheric pressure. When the calculated amount of hydrogen has been taken up, the catalyst is filtered off with exclusion of oxygen, the filtrate is freed from the solvent and the residue is distilled in a high vacuum. 2-(β-dimethylamino-ethylamino)-4:5-dichloroaniline passes over at 140–145° C. under a pressure of 0.08 mm. Hg as a colorless viscous liquid without suffering any appreciable decomposition.

What is claimed is:

A member selected from the group consisting of 1-(β-dimethylamino - ethyl)-2-(p-ethoxy-benzyl)-5:6-dichloro-benzimidazole and its therapeutically useful acid addition salts.

References Cited by the Examiner
UNITED STATES PATENTS

| | | | |
|---|---|---|---|
| 2,980,690 | 4/1961 | Hoffmann et al. | 260—309.2 |
| 3,000,989 | 9/1961 | Hoffmann et al. | 260—309.2 |

OTHER REFERENCES

German application 1,081,019, Hoffmann et al., May 1960.

WALTER A. MODANCE, *Primary Examiner.*

IRVING MARCUS, *Examiner.*